United States Patent
Faur et al.

(10) Patent No.: US 7,636,693 B2
(45) Date of Patent: Dec. 22, 2009

(54) SOFTWARE LICENSE OPTIMIZATION

(75) Inventors: Adrian Faur, Richmond Hill (CA); Andrew Niel Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/947,835

(22) Filed: Sep. 23, 2004

(65) Prior Publication Data
US 2005/0071281 A1    Mar. 31, 2005

(30) Foreign Application Priority Data
Sep. 26, 2003    (CA) .................................... 2442795

(51) Int. Cl.
*G06F 21/00*    (2006.01)
*G06F 7/04*    (2006.01)
*G06F 9/44*    (2006.01)

(52) U.S. Cl. ..................... 705/59; 726/26; 717/168; 717/172; 717/173; 717/177; 717/178

(58) Field of Classification Search ............... None
See application file for complete search history.

(56) References Cited

U.S. PATENT DOCUMENTS

| | | | |
|---|---|---|---|
| 5,742,757 A * | 4/1998 | Hamadani et al. | ........... 726/32 |
| 6,502,124 B1 * | 12/2002 | Shimakawa et al. | ........ 709/203 |
| 2003/0005427 A1 * | 1/2003 | Herrero | ................ 717/178 |
| 2004/0267590 A1 * | 12/2004 | Clark et al. | ................ 705/9 |

* cited by examiner

*Primary Examiner*—Benjamin E Lanier
*Assistant Examiner*—Abdulhakim Nobahar
(74) *Attorney, Agent, or Firm*—Novak, Druce & Quigg, LLP

(57) ABSTRACT

A computer system for managing and deploying a plurality of software with a plurality of associated licenses in the computer system. Software allocation workflow requests are obtained from a requester for a target server referencing specific software and then redirected to a license broker. The license broker determines availability of the plurality of associated licenses referenced in the request and provisions the target server with said plurality of software. The requester of software allocation is then notified of the results. The workflow need not be concerned with monitoring resource status and providing requester feedback. Provisioning is handled on a just-in-time basis by the license broker as requested by the workflow making necessary licenses available (and software) only on as needed basis.

9 Claims, 3 Drawing Sheets

SOFTWARE LICENSE OPTIMIZATION

FIELD OF THE INVENTION

This present invention relates generally to utilization of software licenses in a computer system and more particularly to optimal use of software licenses in a computer system.

BACKGROUND OF THE INVENTION

In general most software applications for business have been deployed in environments with infrastructure designed to handle a peak capacity. Typically systems and support services have been designed with excess capacity built in to handle differences between peak and average use. In fact most of the times these environments do not operate at peak capacity but resources have to be sized to handle the peak demand periods. When not operating at peak capacity the systems and software running thereon are typically underutilized. In many cases software licenses associated with the software installed on these systems, are typically tied to specific environment capacity metrics, resulting in less than optimal cost of ownership. Software licenses have restrictions on the usage of the associated software, such as number of users per copy. The software licensing agreements have typically assumed continuous usage of the resources, while most of the time such usage does not occur.

Sharing licenses or license pooling as is known in the art is one means of making a number of software licenses available for use without having to have assigned one license to every potential user. This sharing approach allows for the acquisition of fewer licenses than would have been provided in a peak demand model. There are fewer licenses than users in a shared or pooled model since the licenses are spread over the user community with the expectation that not all users will need to access the software all of the time. Such licensing models do not typically discriminate among users as to who is authorized to make use of a shared license at a particular time, resulting in problems of allocating licenses to those who need them at a given time.

Therefore what is required is a more cost effective way to manage the availability of software licenses (and associated software) while addressing the needs of users of the software.

SUMMARY OF THE INVENTION

A method, system and program product for automatically provisioning software servers based on user demand for software. Software allocation workflow requests are obtained from a requester for a target server referencing specific software and then redirected to a license broker. The license broker determines availability of the plurality of associated licenses referenced in the request and provisions the target server with said plurality of software. Software programs may be located in a storage means associated with the license server and provided at the request of the license broker through the license server. The requester of software allocation is then notified of the results. The workflow requests are initiated on a just in time basis and the license broker provisions the target resources as needed based on the workflow requests ensuring only that software which is needed is made available. The workflow is not encumbered by resource issues such as license availability which is handled by the license broker.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described, by way of example, with reference to the accompanying drawings, in which.

Figure 1:
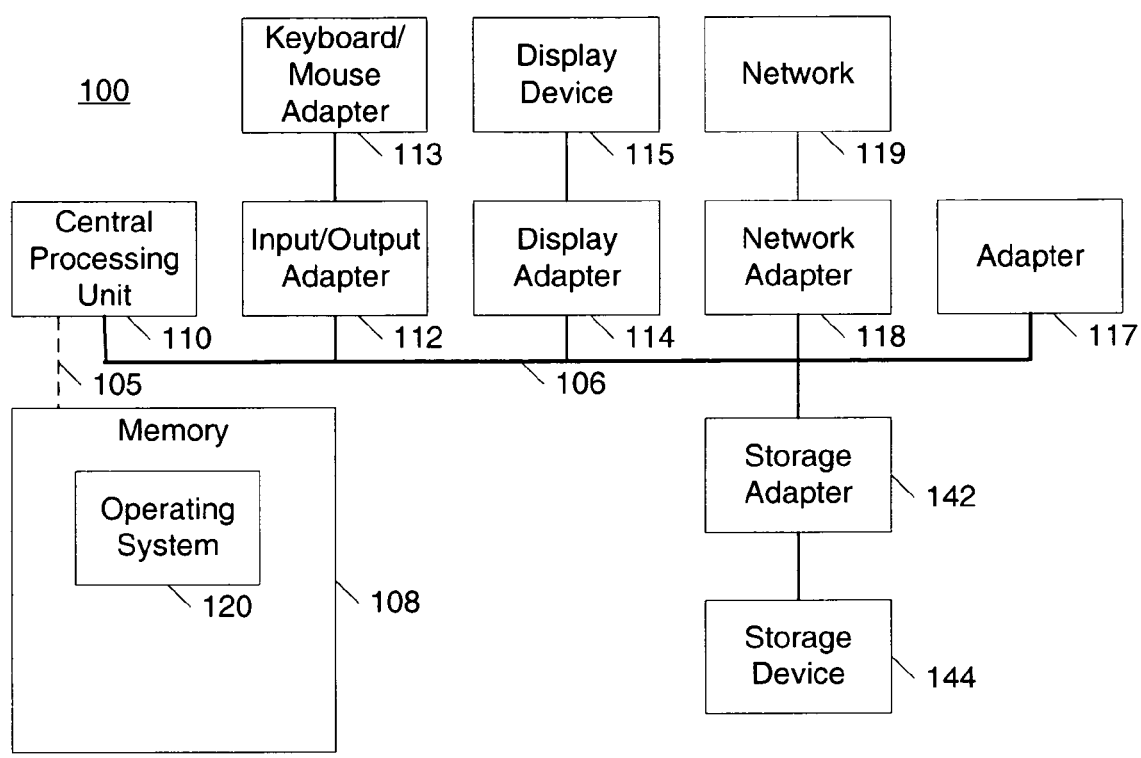
FIG. 1 is a hardware overview of a computer system, in support of an embodiment of the present invention.

Like reference numerals refer to corresponding components and steps throughout the drawings. It is to be expressly understood that the description and the drawings are only for the purpose of illustration and as an aid to understanding, and are not intended as a definition of the limits of the invention.

DETAILED DESCRIPTION

FIG. 1 depicts, in a simplified block diagram, a computer system 100 suitable for implementing embodiments of the present invention. Computer system 100 has processor 110, which is a programmable processor for executing programmed instructions stored in memory 108. Memory 108 can also include hard disk, tape or other storage media. While a single CPU is depicted in FIG. 1, it is understood that other forms of computer systems can be used to implement the invention. It is also appreciated that the present invention can be implemented in a distributed computing environment having a plurality of computers communicating via a suitable network 119.

CPU 110 is connected to memory 108 either through a dedicated system bus 105 and/or a general system bus 106. Memory 108 can be a random access semiconductor memory for storing application data for processing such as that in a database partition. Memory 108 is depicted conceptually as a single monolithic entity but it is well known that memory 108 can be arranged in a hierarchy of caches and other memory devices. FIG. 1 illustrates that operating system 120 may be stored in memory 108. Memory 108 may also serve as a store for an allocation workflow component, an interceptor component and an automated management component, all of which are described in greater detail below. The interceptor component intercepts allocation workflow requests for software installation directed toward a target server, which may be a logical or physical entity located on, within or remote to system 100 without influencing the relationship with the allocation workflow component.

Operating system 120 provides functions such as device interface management, memory management, multiple task management, and the like as known in the art. CPU 110 can be suitably programmed to read, load, and execute instructions of operating system 120. Computer system 100 has the necessary subsystems and functional components to implement selective program tracing functions such as gathering trace records and historical data as will be discussed later. Other programs (not shown) can include server software applications in which network adapter 118 interacts with the server software application to enable computer system 100 to function as a network server via network 119.

General system bus 106 supports transfer of data, commands, and other information between various subsystems of computer system 100. While shown in simplified form as a single bus, bus 106 can be structured as multiple buses arranged in hierarchical form. Display adapter 114 supports video display device 115, which is a cathode-ray tube display or a display based upon other suitable display technology. The Input/output adapter 112 supports devices suited for input and output, such as keyboard or mouse device 113, and a disk drive unit (not shown). Storage adapter 142 supports one or more data storage devices 144, which could include a magnetic hard disk drive or CD-ROM, although other types of data storage devices can be used, including removable media.

Adapter 117 is used for operationally connecting many types of peripheral computing devices to computer system 100 via bus 106, such as printers, bus adapters, and other computers using one or more protocols including Token Ring, LAN connections, as known in the art. Network adapter 118 provides a physical interface to a suitable network 119, such as the Internet. Network adapter 118 includes a modem that can be connected to a transmission system such as a telephone line for accessing network 119. Computer system 100 can be connected to another network server via a local area network using an appropriate network protocol and the network server that can in turn be connected to the Internet. FIG. 1 is intended as an exemplary representation of computer system 100 by which embodiments of the present invention can be implemented. It is understood that in other computer systems, many variations in system configuration are possible in addition to those mentioned here.

Figure 2:
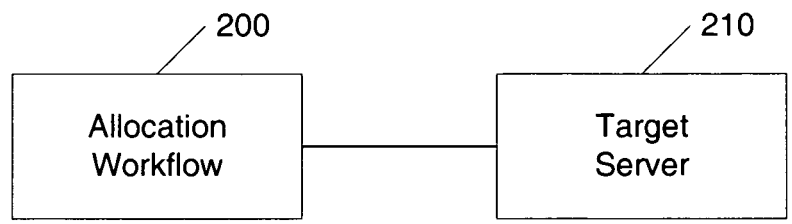
FIG. 2 is a diagram of a current allocation workflow and target server relationship as supported in the computer system of FIG. 1.

FIG. 2 is a simplified view of the current relationship between software allocation workflow 200, and target server 210 in which requests to have selected software made available for use are initiated and resolved. Typically there is a direct connection between allocation workflow 200 and target server 210 wherein the connection may be physical or logical. Allocation workflow 200 comprises a plurality of requests for the installation of software on target server 210. Such requests may be in a script directing specific installation activity be performed to install the selected software onto target server 210 or other suitable forms of operational transactions to effect the loading or installation of the desired software.

Figure 3:
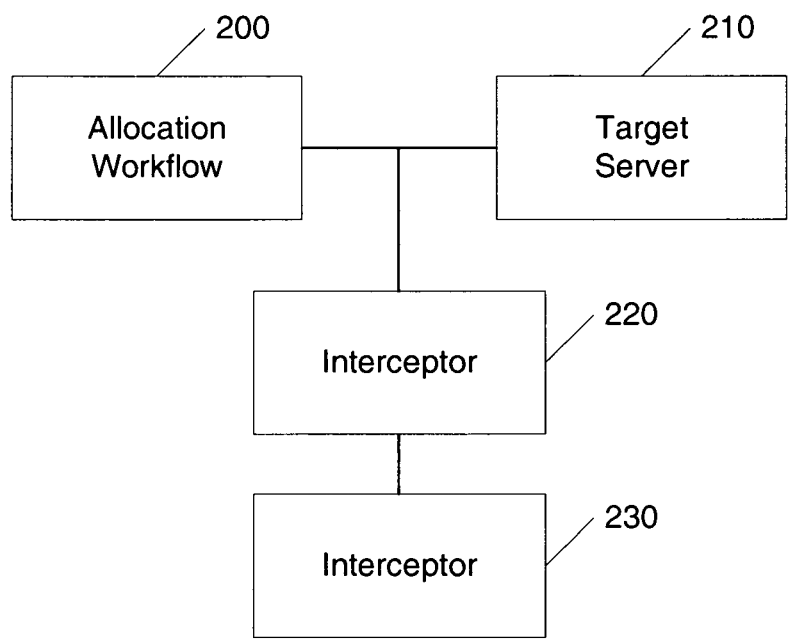
FIG. 3 is a diagram of an allocation workflow and target server relationship of FIG. 2 including an embodiment of the present invention.

FIG. 3 is a diagram of an embodiment of the present invention inserted within the relationship described in FIG. 2. This diagram shows the addition of components interceptor 220 and automated management 230 as an embodiment of the present invention. The role of interceptor 220 is to catch workflow transactions from allocation workflow 200, process such transactions unknown to allocation workflow 200 and target server 210. In doing so, the use of interceptor 220 is transparent to both ensuring continuing operation as in the prior relationship.

Figure 4:
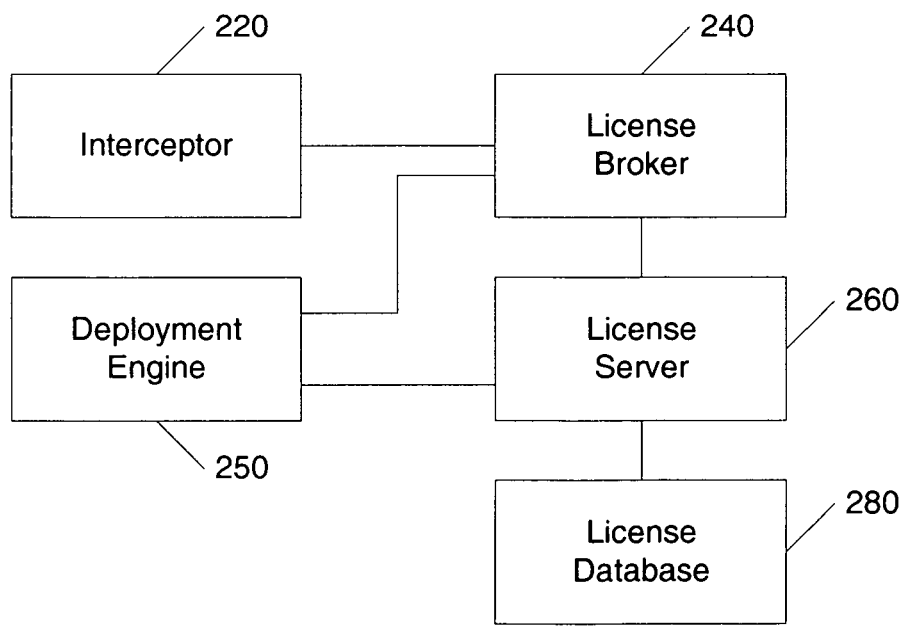
FIG. 4 is a detailed view of components as in the embodiment of the present invention of FIG. 3.

FIG. 4 is a diagram showing further detail of the components of automated management component 230 in conjunction with interceptor 220. Interceptor 220 communicates license allocation requests to license broker 240. License broker 240 is responsible for managing the software licenses under its control. A repository of licenses managed by license broker 240 is contained within license server 260 with associated license database 280. License database 280 may also contain the associated software programs, or they may reside on storage means suitable for on-demand retrieval. Tasks associated with allocation and installation of software are handed through deployment engine 250 which communicates through interceptor 220 to target server 210 to effect installation of requested software.

Software licenses managed by license broker 240 on license server 260 contained within license database 280 may be viewed as reusable licenses in a pool. These licenses are homogeneous in nature making them suited for reuse. Any one of a specific set of licenses contained within a pool may be substituted for another of the same set with the same results being obtained. Licenses within a set are interchangeable. Each license pool also has an owner and a number of configured clients. Clients in this case are software installations for which the license pool was specified at software configuration time. Ownership allows accounting of license usage back to a single entity.

Further each license has an associated key required to install the software and functions as a reservation unit. An allocation transaction captures the runtime aspect of the software license allocation and deallocation. The difference between the two timestamps is the actual usage time of the specific license.

Figure 5:
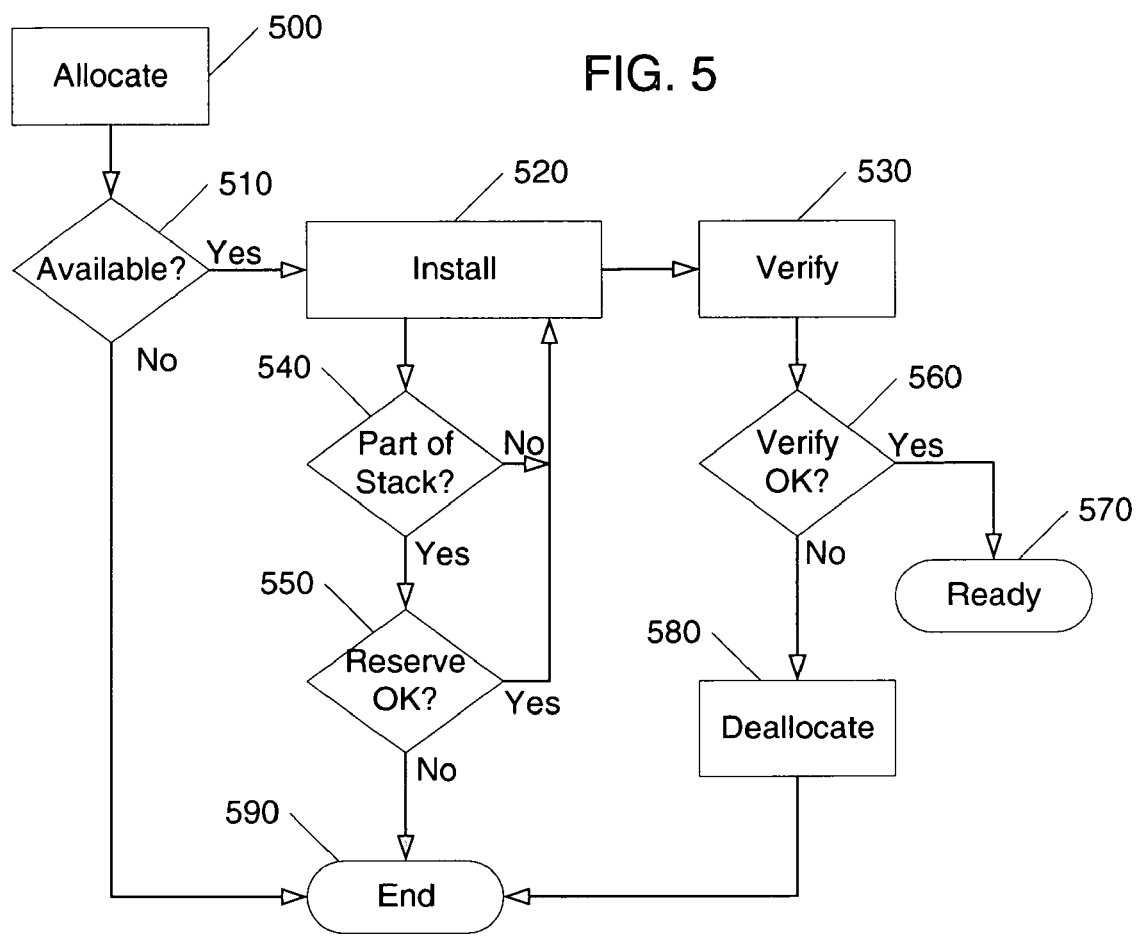
FIG. 5 is a flow diagram of activities performed in an embodiment of the present invention as shown in FIG. 4.

FIG. 5 is a flowchart describing the steps in the process of automated software license management as in an embodiment of the present invention which commences with operation 500 wherein an allocation is received requesting specific software being made available on a specified target server. Upon receiving a request in operation 500, processing moves to step 510 during which the requested software is checked for availability. If the requested software is not available, the request fails ending the allocation workflow at step 590. If on the other hand the software is available, processing moves to step 520. During step 520 installation initialization occurs and processing moves to step 540. During step 540 it is determined if a request involves a software stack. If it is determined that there is only a single software element requested, processing continues without such reservation needed and the requested software is obtained and installed. If it is determined that there is a software stack processing moves to step 550 during which a reservation must be placed on all the requested software in that stack. If the requested reservation is not successful, then there will be no further software install activity and the allocation workflow will be stopped with processing ending at step 590. If the reservation is successful, processing moves to finalize the software installation after which processing moves to step 530. During step 530 verification of the software installation begins and processing moves to step 560. If it is determined during step 560 that the requested software has in fact been installed as requested, the associated licenses are marked ready and processing ends at step 570. If the verification during step 560 indicates that the software installation was not successful, processing moves to step 580. During step 580 licenses involved in the failed request are made free for reuse and processing then moves to completion at step 590.

It is expected that software requested to be installed can be installed by means of silent installation. Silent installation provides a mode of installation that does not require operator intervention.

The process described in FIG. 5 may be used to enforce license management control. The interception of normal workflow requests allows continued use of existing workflows without effecting numerous changes to realize the benefits of more effective control. Implementation of the described process typically ensures that only those licenses specifically needed as requested may be made allocated. During the process numerous checks are made to determine if the software actually exists for installation, and was in fact installed. Further for a complex set of software, as software stack, in which there is inherent dependencies, verification is also performed to ensure complete installation of the required set. Failure to complete an allocation request for all or part of the software requested results in a rollback to free any encumbered licenses.

Although the invention has been described with reference to illustrative embodiments, it is to be understood that the invention is not limited to these precise embodiments and that various changes and modifications may be effected therein by one skilled in the art. All such changes and modifications are intended to be encompassed in the appended claims.

What is claimed is:

1. A method for automatically provisioning software servers based on user demand for software, said method comprising the steps of:
    storing a repository of licenses in a license database within a license server, the repository of licenses being managed by a license broker;
    obtaining a software allocation workflow request from a requester for a target server referencing at least one software program, wherein the workflow request is initiated on a just in time basis, and wherein the referenced software program is a software stack containing a plurality of software elements;
    intercepting the request from the requester by an interceptor and redirecting the request to the license broker;
    dynamically determining availability of the plurality of software elements and associated licenses of the plurality of software elements referenced in said request at a time of the request by the license broker;
    provisioning said target server with said at least one software program from the license server and notifying the requester of provisioning of the at least one software program if it is determined that all of the software elements and the associated licenses are available at the time of the request; and
    freeing any encumbered licenses back to the repository of licenses if any of the plurality of software elements and associated licenses is not available or any of the plurality of software elements fails to be installed.

2. The method of claim 1, wherein the step of determining availability of said associated licenses further comprises:
    determining ownership of said associated licenses;
    identifying a license server of said associated licenses based on said ownership determination; and,
    querying a database of software licenses associated with said license server.

3. The method of claim 2, wherein said step of provisioning said target server with said at least one software program further comprises:
    deploying said at least one software program on said target server from a database of software programs associated with said license server; and
    validating said deployment;
    wherein if said deployment fails, withdrawing any license associated with the failed deployment.

4. A computer system for automatically provisioning software servers based on user demand for software, comprising:
    a license server having a license database for storing a repository of licenses;
    a license broker for managing the repository of licenses;
    a requester for initiating a software allocation workflow request for a target server referencing at least one software program, wherein the workflow request is initiated on a just in time basis, and wherein the referenced software program is a software stack containing a plurality of software elements;
    an interceptor for intercepting the request from the requester and redirecting the request to the license broker, wherein the license broker dynamically determines availability of the plurality of software elements and associated licenses of the plurality of software elements referenced in the request at a time of the request; and
    a provisioning engine for provisioning the target server with the at least one software program from the license server and notifying the requester of provisioning of the at least one software program if it is determined that all of the software elements and the associated licenses are available at the time of the request;
    wherein any encumbered licenses are freed back to the repository of licenses if any of the plurality of software elements and associated licenses is not available or any of the plurality of software elements fails to be installed.

5. The system of claim 4, wherein the license broker further:
    determines ownership of the associated licenses;
    identifies a license server of the associated licenses based on the ownership determination; and
    queries a database of software licenses associated with the license server.

6. The system of claim 5, wherein the provisioning engine further:
    deploys the at least one software program on the target server from a database of software programs associated with the license server;
    validates the deployment; and
    if the deployment fails, withdraws any license associated with the failed deployment.

7. A machine-readable storage, having stored thereon a computer program having a plurality of code sections executable by a machine for causing the machine to perform a method for automatically provisioning software servers based on user demand for software comprising the steps of:
    storing a repository of licenses in a license database within a license server, the repository of licenses being managed by a license broker;
    obtaining a software allocation workflow request from a requester for a target server referencing at least one software program, wherein the workflow request is initiated on a just in time basis, and wherein the referenced software program is a software stack containing a plurality of software elements;
    intercepting the request from the requester by an interceptor and redirecting the request to the license broker;
    dynamically determining availability of the plurality of software elements and associated licenses of the plurality of software elements referenced in said request at a time of the request by the license broker;
    provisioning said target server with said at least one software program from the license server and notifying the requester of provisioning of the at least one software program if it is determined that all of the software elements and the associated licenses are available at the time of the request; and
    freeing any encumbered licenses back to the repository of licenses if any of the plurality of software elements and associated licenses is not available or any of the plurality of software elements fails to be installed.

8. The machine-readable storage of claim 7, wherein the step of determining availability of the associated licenses further comprises:

determining ownership of the associated licenses;
identifying a license server of the associated licenses based on the ownership determination; and,
querying a database of software licenses associated with the license server.

9. The machine-readable storage of claim 8, wherein the step of provisioning the target server with the at least one software program further comprises:

deploying the at least one software program on said target server from a database of software programs associated with said license server; and
validating said deployment;
wherein if said deployment fails, withdrawing any license associated with the failed deployment.

* * * * *

UNITED STATES PATENT AND TRADEMARK OFFICE
CERTIFICATE OF CORRECTION

PATENT NO. : 7,636,693 B2  Page 1 of 1
APPLICATION NO. : 10/947835
DATED : December 22, 2009
INVENTOR(S) : Faur et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 986 days.

Signed and Sealed this

Ninth Day of November, 2010

David J. Kappos
*Director of the United States Patent and Trademark Office*